United States Patent
Tanaka et al.

[11] Patent Number: 6,113,832
[45] Date of Patent: Sep. 5, 2000

[54] LEVER FOR AN AUTOMATIVE DOOR CHECKING DEVICE AND A METHOD FOR MANUFACTURING THE SAME

[75] Inventors: Tsuneyoshi Tanaka, Nagoya; Junji Okumura, Takahama; Hiroki Nasuda, Obu, all of Japan

[73] Assignees: Aisin Seiki Kabushiki Kaisha; Aisin Kako Kabushiki Kaisha, both of Japan

[21] Appl. No.: 08/220,583

[22] Filed: Mar. 31, 1994

Related U.S. Application Data

[63] Continuation of application No. 07/911,804, Jul. 10, 1992, abandoned, which is a continuation of application No. 07/498,543, Mar. 26, 1990, abandoned.

[30] Foreign Application Priority Data

Mar. 28, 1989 [JP] Japan ........................................ 1-77682

[51] Int. Cl.$^7$ .................................................... B29C 13/00
[52] U.S. Cl. .......................... 264/279; 264/275; 264/108; 264/325; 425/32
[58] Field of Search .................................. 264/108, 273, 264/275, 279.1, 325, 279; 425/32, 129.1, 519

[56] References Cited

U.S. PATENT DOCUMENTS

| | | |
|---|---|---|
| 2,453,739 | 11/1948 | Bates . |
| 2,688,774 | 4/1954 | Malinowski et al. . |
| 3,635,879 | 1/1972 | Baer et al. . |
| 4,102,831 | 7/1978 | Osgood . |
| 4,203,732 | 5/1980 | Phaal . |
| 4,369,152 | 1/1983 | Gray et al. . |
| 4,393,020 | 7/1983 | Li et al. . |
| 4,493,808 | 1/1985 | Sedlatschek et al. . |
| 4,732,204 | 3/1988 | Tabardin . |

FOREIGN PATENT DOCUMENTS

| | | |
|---|---|---|
| 1459 176 | 1/1969 | Germany . |
| 58-18529 | 4/1983 | Japan . |
| 59-8886 | 3/1984 | Japan . |
| 59-181174 | 12/1984 | Japan . |
| 62-29658 | 7/1987 | Japan . |
| 2002673 | 2/1979 | United Kingdom . |
| 2178693 | 2/1987 | United Kingdom . |

OTHER PUBLICATIONS

DE–Z Kunststoffe 1989, issue 9, pp. 797–803.
DE–Z Kunststoff–Rundschau, 1962, issue 1, pp. 12–14.
DE–Z Technische Rundschau, 42/88, pp. 38–49.
"Guide To Mold Design For Injection Molding The Plastics".
Schindungseigenschaften von duroplasten; kunstsofftecnik (1974) Nr. 1/2.

*Primary Examiner*—Merrick Dixon
*Attorney, Agent, or Firm*—Finnegan, Henderson, Farabow, Garrett & Dunner, L.L.P.

[57] ABSTRACT

An improved method for manufacturing a lever for an automotive door checking device and the lever produced by the method. According to the invention, the mold employed for the molding of the sliding part of the lever has a gate at one of the two longitudinal ends of the cavity wall so that the molten resin containing reinforcing fibers flows in and fills up the cavity along the longitudinally extending direction corresponding to the sliding direction of the sliding part. As a result, the reinforcing fibers embedded in the sliding part are one-dimentionally oriented to the sliding direction thereof, which provides anti-wearing property, durability and good sliding characteristics of the lever.

7 Claims, 2 Drawing Sheets

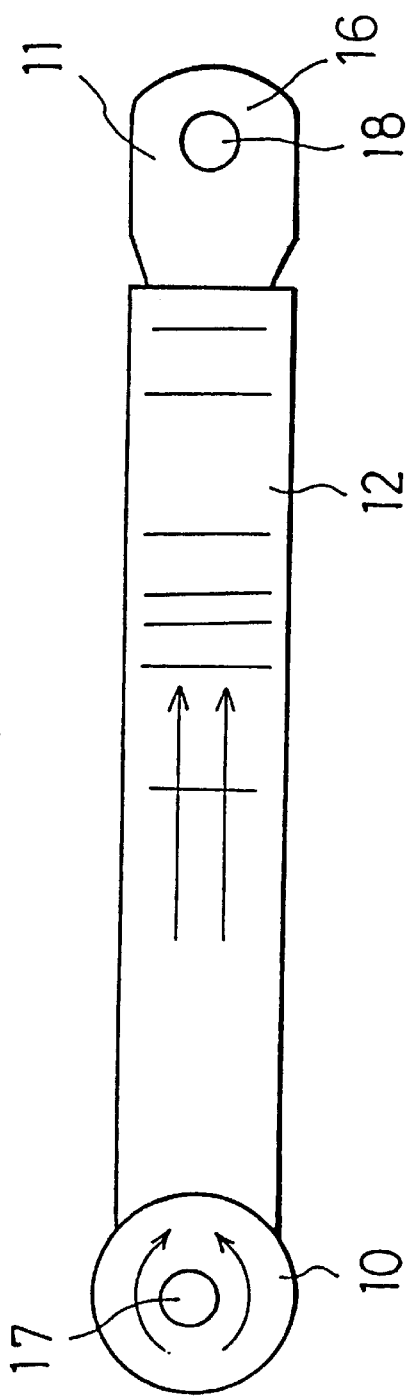
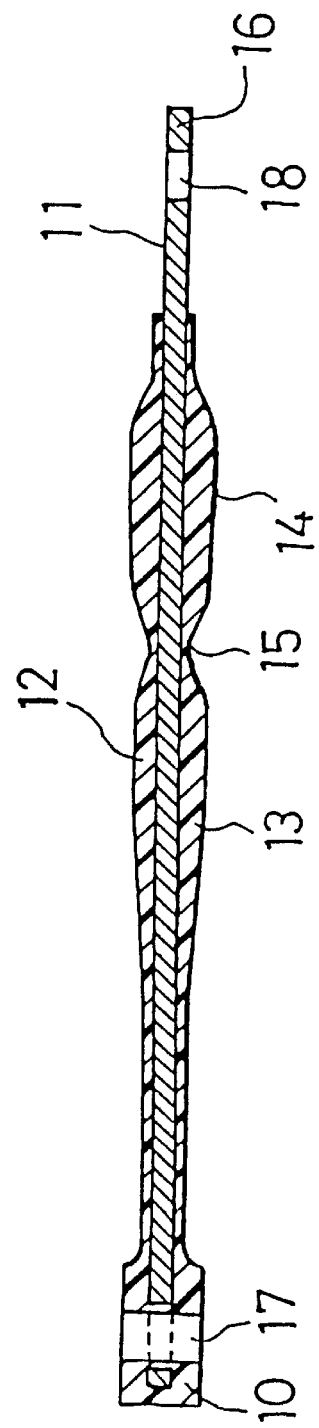

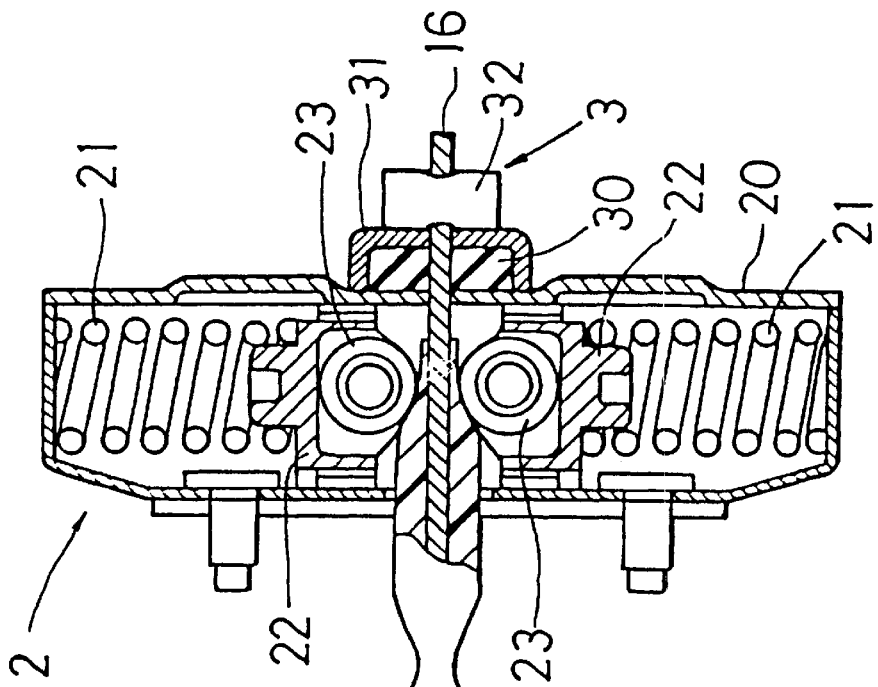
FIG. 3
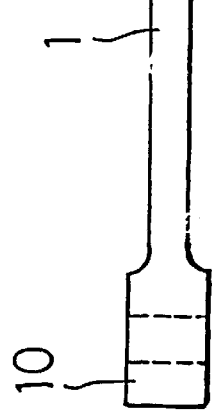
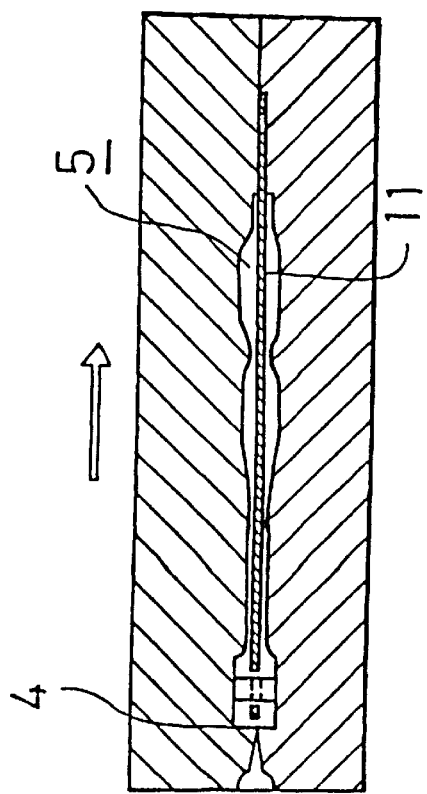
FIG. 4

LEVER FOR AN AUTOMATIVE DOOR CHECKING DEVICE AND A METHOD FOR MANUFACTURING THE SAME

This application is a continuation, of application Ser. No. 07/911,804 filed Jul. 10, 1992, now abandoned, which is a continuation of application Ser. No. 07/498,543 filed Mar. 26, 1990 (now abandoned).

BACKGROUND OF THE INVENTION

1. Field of the Invention

This invention relates to a method for manufacturing a lever for an automotive door checking device, particularly to a method for molding a resin lever in a mold, and to the lever produced in accordance with the method.

2. Description of the Prior Art

A door checking device is mounted to an automobile door to enable maintaining the door in phased half open state.

As it is disclosed in the Japanese Examined Utility Model Publications (KOKOKU) Nos.18529/1983 and 8886/1984, the conventional door checking device is composed of: a lever having the upper and lower surfaces as sliding surfaces and movably pivoted to the piller of the automotive body, and a retainer member mounted to the door, wherein the lever is incorporated into the retainer member in such a manner that the lever passes through the retainer member and the retainer member slides along the upper and lower surfaces of the lever upon opening and closing of the door. Stopper parts are formed on the upper and lower sliding surfaces of the lever at the places corresponding to half or full open state of the door. Accordingly, when the retainer member is positioned at the respective stopper part of the lever, the door may be held in half or full open state.

In the above described conventional automotive door checking device, a metal lever is employed and therefore, grease application is required at the sliding surfaces of the lever. However, the grease application to the lever presents numerous problems as follows:

1). When door is opened, the greased lever is exposed for view and it greatly reduces the aesthetic property of the automobile.

2). The greased lever is susceptive to collecting dust, dirt, etc. Also, the grease may spread further to the other part of the door or the automotive body.

3). In the event that the grease is running short, the sliding performance of the retainer member on the lever becomes less smooth and generates noises.

In order to avoid the use of grease, the metal lever may be replaced with a resin lever. However, durability and anti-wearing property of the resin lever has been still questionable in actual use.

SUMMARY OF THE INVENTION

For obviating the foregoing defects, it is an object of the present invention to provide a novel method to produce a resin molded lever which does not require the application of grease and still exhibits the same good property of durability, wear resistance, etc. equal to those of the conventional metal levers.

It is another object of this invention to provide a superior resin molded lever described above in accordance with the novel method of the present invention.

It is found by the inventors of the present invention that durability and wear resistance of resin molded levers for automotive door checking device greatly depends on material compositions and molding conditions of the levers. And as a result of researches, the inventors have discovered material compositions and molding conditions for producing superior resin molded levers which satisfy all of the requirements.

According to the present invention, all elongated, plate-shape lever is produced, and a sliding part is formed on at least one of the surfaces of the lever and a retainer member slides on the sliding part along the longitudinal direction thereof upon opening and closing of the door, and at least the sliding part of the lever is formed by resin molding.

The present inventive method is characterized in that: The mold cavity of a split mold employed has a longitudinally extended shape and a gate is positioned at one of the two longitudinal end of the cavity wall contiguous to the molding section of either one of the two longitudinal ends of the sliding part of the lever. In the molding a matrix resin material is mixed with reinforcing fibers and heated. The thus prepared molten resin containing reinforcing fibers is introduced into the mold cavity from the gate and the molten resin flows in and fills up the cavity along the longitudinally extending direction corresponding to the sliding direction of the sliding part.

According to the present invention, the thermoplastic resin such as nylon resin, polyacetal resin, PPS, PET and PBT or thermosetting resin such as phenol resin, amide imide resin and the like may be employed as a matrix resin.

And reinforcing fibers are mixed in the above-listed resin materials. For the reinforcing fibers, conventional reinforcing fibers, such as glass fibers, aromatic polyamide fibers (hereinafter referred to as aramid fibers), carbon fibers, potassium titanate fibers and the like may be employed. Of all the conventional reinforcing fibers, aramid fibers may be the best choice since they have the superior sliding characteristics than others.

The length of the reinforcing fibers mixed with the matrix resin previous to the molding is preferably from 3.0 to 15 mm-long. It is because the reinforcing fibers of 3.0 to 15 mm-long may get damaged during the molding and consequently, the length is reduced to about 0.3 to 5.0 mm-long. The reinforcing fibers of 0.3 to 5.0 mm-long embedded in the matrix resin will provide good value of mechanical property, sliding characteristics and wear resistance as well as superior aesthetic appearance to the molded sliding part. If the reinforcing fibers embedded in the sliding part have a length less than 0.1 mm-long, anti-wearing property of the molded sliding part will be decreased. On the other hand, if the reinforcing fibers have an excessive length, aesthetic appearance of the molded sliding part will be degraded.

The volumetric amount of the reinforcing fibers is from 2.3% to 76%, by volume based on 100% of the total volume of the molded sliding part. It is because if the reinforcing fiber is contained less than 2.3% by volume based on 100% of the total volume of the molded sliding part, the reinforcing effect of the reinforcing fibers in the matrix resin will not be expected. On the other hand, if the volumetric amount of the reinforcing fibers is more than 76% by volume based on 100% of the total volume of the molded sliding part, moldability of the matrix resin will be lowered. Also, when aramid fibers are employed as reinforcing fibers, the volumetric amount of aramid fibers will preferably be from 4.5% to 35%, by volume based on 100% of the total volume of the molded sliding part.

As it is explained above, the characteristics of the present inventive method reside in that the mold has a gate positioned at one of the two longitudinal ends of the cavity wall contiguous to the molding section of either one of the two longitudinal ends of the sliding part. Accordingly, when molten matrix resin containing reinforcing fibers is introduced into the mold cavity from the gate, it flows in and fills up the cavity along the direction corresponding to the sliding direction of the molded sliding part.

In case if the mold has a gate at any part of the longitudinal side wall of the cavity, molded sliding part will have problems in that embedded reinforcing fibers in the matrix resin are oriented randomly and weld line may be appeared on the sliding part. Further, the same problems said above will be occurred if the mold cavity is provided with a plurality of feed ports. As it is found by the inventors through the researches that randomly oriented reinforcing fibers and appearance of weld line on the sliding part will be causes of irregular abrasion or cracking thereof. These defects eventually change the force of sliding or lower the durability of the sliding part.

Accordingly, the present invention provides the resin molded lever in which the embedded reinforcing fibers are one-dimentionally oriented to the sliding direction of the molded sliding part and are free from weld lines.

For the molding process, injection moldings, transfer moldings and the like may be employed. Further, it is preferable to employ insert molding method using metal insert. In this case, only sliding part of the lever is to be formed by the resin molding.

BRIEF DESCRIPTION OF THE DRAWINGS

Other objects and features of the invention will become apparent to those skilled in the art as the disclosure is made in the following description of a preferred embodiment of the invention, as illustrated in the accompanying sheets of drawings, in which:

FIG. 1 is a plan view of a lever, for an automotive door checking device, produced in accordance with a preferred embodiment of the present invention:

FIG. 2 is a section view thereof;

FIG. 3 is a section view showing the lever mounted on an automotive door checking device; and FIG. 4 is a schematic sectional view of a mold used in the preferred embodiment of the present invention.

DETAILED DESCRIPTION OF THE INVENTION

FIGS. 1 and 2 show an elongated, plate-shape lever, for an automotive door checking device, produced in accordance with a preferred embodiment of the present inventive method. FIG. 3 is a sectional view of an automotive door checking device with a lever shown in FIGS. 1 and 2. The automotive door checking device in FIG. 3 is composed of: a lever 1 movably pivoted in horizontal direction to the piller of the automotive body by the longitudinal end 10, and a retainer member 2 mounted to the door. The upper and lower surfaces of the lever 1 are made as sliding part and the retainer member 2 is passed through by the lever 1. In practice, the retainer member 2 slides along the sliding part of the lever 1 upon closing and opening of the door.

The lever 1 is composed of: a metal insert 11, and a sliding part 12 composed of a resin layer covering the entire surface of the metal insert 11 except one end part of the insert 11 as shown in FIG. 2. The sliding part 12 of the lever 1 has two pair of bulging portions 13 and 14 at the upper and lower surfaces thereof. A recess 15 is also formed at an interval of the two pair of the bulging portions 13 and 14. A pivoting hole 17 at one longitudinal end 10 and a pinhole 18 at the other longitudinal end 16 are respectively provided in the lever 1. The longitudinal end 10 of the lever 1 is pivoted at the piller of the automotive body (not shown) in the horizontal direction by means of the pivoting hole 17.

The retainer member 2 is composed of: a case 20, a pair of springs 21 disposed in the case 20, a pair of holders 22 pushed by the spring force of the springs 21 to the direction close to each other, and a pair of rollers 23 rotatably disposed in the pair of holders 22. The pair of rollers 23 are also pushed by the spring force of the springs 21 through the holders 22 to the direction close to each other and the lever 1 is put between the pair of holders 22. In practice, the pair of rollers 23 are rolled to have sliding contact with the sliding part 12 of the lever 1 therebetween upon opening and closing of the door. Further, a plate 31 having a buffer 30 is mounted to the other end 16 of the lever by means of a pin 32, and they are composing a stopper means 3 to regulate the movement of the retainer member 2.

The lever 1 was produced as an example in accordance with a preferred embodiment of the present invention as follows:

In this example, for the matrix resin, ZYTEL 103 HSL (trademark) produced by E.I. du Pont de Nemours & Company, and which was a 66 nylon, was used. For the reinforcing fibers, Kevlar 49 (trademark) produced by E.I. du Pont de Nemours & Company, and which were aramid fibers, were used.

Firstly, pellets were produced as follows:

The aramid fibers were coated with the 66 nylon in the manner that the roving of the aramid fibers are aligned in an axial direction thereof. The thus formed body was cut into 6 mm-long pellets. The aramid fibers embedded in the pellets were also 6 mm-long. The volumetric amount of the aramid fibers was 16% by volume based on 100% of the total volume of the molded sliding part.

An insert injection molding was performed with the pellets in accordance with the following molding conditions:

A 100 ton thermoplastic type injection molding machine was used.

temperature of the cylinder: 290° C. at front end 260° C. at rear end temperature of the mold: 80° C.

injection pressure: 60 kg/cm$^2$ (gauge pressure)

injection time: 15 seconds cooling time: 15 seconds insert: a metal insert of 1.6 mm-thick As shown in FIG. 4, a split mold used in this example had a longitudinally extending cavity 5 whose contour corresponds to the shape of the sliding part 12 of the lever 1 to be molded therein. A gate 4 was positioned at one of the two longitudinal ends of the cavity wall contiguous to the molding section of the longitudinal end 10 of the lever 1.

A metal insert 11 was placed on mold cavity previously.

The upper molten section of the split mold was positioned on the lower mold section and they were clamped.

The molten state of the 66 nylon containing the aramid fibers were introduced into the mold cavity from the gate 4 and it flowed in and filled up the mold cavity in the direction indicated by an arrow in FIG. 4 which corresponds to the sliding direction of the molded sliding part 12.

Then, the molded body was released from the mold after the solidification. Accordingly the lever 1 was produced.

The thus produced lever 1 had a sliding part formed on the upper and lower surfaces thereof and the aramid fibers were embedded in the matrix resin of the sliding part in the manner that they were one-dimentionally oriented to the direction corresponding to the sliding direction of the molded lever 1. Further, no weld line was appeared on the sliding part 12 of the lever 1. The length of the aramid fibers embedded in the obtained lever was measured in such a manner that the lever 1 was resolved in an proper solvent to define the aramid fibers and matrix resin. Then the aramid fibers were taken out from the solvent for measuring. As a result, aramid fibers having the average length of 1.4 mm-long were dispersed in the matrix resin. Further, the length of the aramid fibers was ranging from 0.5 to 2.0 mm.

COMPARATIVE EXAMPLE

The same type of the mold having longitudinally extending cavity was used as the previous example but the gate was provided at a center part of the longitudinal side wall of the cavity.

Other than the mold described above, the comparative example was manufactured under the same conditions for manufacturing the example of the embodiment according to the present invention.

EVALUATION TESTS

Several tests were conducted to evaluate the levers made respectively in accordance with the preferred embodiment of the present invention and with the comparative example method. In the tests, the levers were mounted to an automotive door checking device. The amount of wear, torque maintaining rate, and sliding performance were evaluated in the following manners.

Type of an endurance test performed by opening and closing the automobile door with the above-mentioned lever 30,000 times at room temperature, which device is assembled to an automobile body.

1. amount of wear: the thickness of the sliding part was measured before and after an endurance test.
2. torque maintaining rate: the sliding torque was measured before and after the endurance test.
3. sliding performance: noise generated by the slidings and smoothness of the slidings before the endurance test were observed.

As a result of the tests, the amount of wear measured on the sliding part of the lever produced in accordance with the embodiment of the present invention was from 80 to 90% less than that of the comparative example lever. On the other hand, torque maintaining rate of the sliding part of the lever in accordance with the embodiment of the present invention is increased 50% over that of the comparative example lever. The sliding performance on both levers were about the same level.

The superiority of the lever produced in accordance with the present invention was proved by the above results of the evaluation. The advantages of the present invention reside greatly in that the mold has the gate positioned at one of the two longitudinal ends of the cavity wall contiguous to the molding section of either one of the longitudinal ends of the sliding part of the sliding part. Accordingly, when the molten state matrix resin containing reinforcing fibers is introduced into the mold cavity from the gate, the molten state matrix resin flows in and fills up the mold cavity in the direction corresponding to the sliding direction of the molded sliding part. In effect, the lever produced in accordance with the present inventive method has the sliding part in which the reinforcing fibers embedded therein are one-dimentionally oriented to the direction along the sliding direction of the sliding part and no weld line is formed.

Thus, irregular abrasion, cracking and the like will not be developed on the sliding surfaces of the lever. Accordingly, torque of the sliding operation is stabilized, and which leads to a long, smooth service life of the lever with good property of sliding characteristics and wear resistance. Further, the problems concerning the grease application will not be brought up since at least the sliding part of the lever is of resin molding.

Obviously, numerous modifications and variations of the present invention are possible in light of the above teachings. It is therefore to be understood that within the scope of the appended claim, the invention may be practiced otherwise than as specifically described herein.

What is claimed is:

1. A method for producing an elongated, plate-shape lever for an automotive door checking device, in which an elongated sliding part is formed on at least one surface of said lever and at least said sliding part is formed by resin molding; said method comprising the molding steps of:

preparing a split mold having a longitudinally extending mold cavity therin and a gate in flow communication with said mold cavity, said gate being positioned in a first of the two longitudinal ends of said mold cavity at the extreme end thereof;

placing an elongated, plate-shape metal insert in said mold cavity so that the insert extends longitudinally in the mold cavity and a first end thereof is positioned opposite said gate;

clamping said split mold;

introducing a molten matrix resin containing reinforcing fibers into said mold cavity from said gate and flowing said matrix resin longitudinally along said mold cavity and said insert from said gate to a second end of said mold cavity remote from said gate to form said sliding part on said metal insert, said sliding part extending longitudinally along said metal insert in a sliding direction of said sliding part, being free of a weld line and having said reinforcing fibers one-dimensionally oriented therein along the length of said sliding part; and releasing the resulting lever having said sliding part integrally formed over said metal insert from said split mold after solidification of said sliding part.

2. The method for producing an elongated, plate-shape lever for an automotive door checking device according to claim 1, wherein the volumetric amount of said reinforcing fibers is from 2.3 to 76%, by volume based on 100% of the total volume of said sliding part.

3. The method for producing an elongated, plate-shape lever for an automotive door checking device according to claim 1, wherein the volumetric amount of said reinforcing fibers is from 4.5 to 35%, by volume based on 100% of the total volume of said sliding part.

4. The method for producing all elongated, plate-shape lever for an automotive door checking device according to claim 1, wherein said reinforcing fibers are aromatic polyamide fibers.

5. The method for producing an elongated, plate-shape lever for an automotive door checking device according to claim 1, wherein the length of said reinforcing fibers mixed with matrix resin before molding is ranging from 3 to 15 mm.

6. The method of claim 1, wherein said resin is a nylon resin.

7. The method of claim 1, wherein said mold has an upper mold section and a lower mold section and said gate is formed by opposing gate cavities in said mold sections.

* * * * *